United States Patent
Nagano

(10) Patent No.: US 12,472,884 B2
(45) Date of Patent: Nov. 18, 2025

(54) SILENCER COVERING PROTRUSION OF PANEL WITH FITTING PORTION AND STOPPER PORTION FITTED EACH OTHER

(71) Applicant: TOYOTA BOSHOKU KABUSHIKI KAISHA, Aichi-ken (JP)

(72) Inventor: Masahiro Nagano, Aichi-ken (JP)

(73) Assignee: TOYOTA BOSHOKU KABUSHIKI KAISHA, Aichi-Ken (JP)

(*) Notice: Subject to any disclaimer, the term of this patent is extended or adjusted under 35 U.S.C. 154(b) by 316 days.

(21) Appl. No.: 18/124,042

(22) Filed: Mar. 21, 2023

(65) Prior Publication Data

US 2023/0382317 A1    Nov. 30, 2023

(30) Foreign Application Priority Data

May 25, 2022    (JP) ................... 2022-084942

(51) Int. Cl.
     *B60R 13/08*    (2006.01)
     *B32B 3/06*    (2006.01)
     *B32B 3/26*    (2006.01)
     *B32B 3/30*    (2006.01)

(52) U.S. Cl.
     CPC ............. *B60R 13/08* (2013.01); *B32B 3/06* (2013.01); *B32B 3/266* (2013.01); *B32B 3/30* (2013.01); *B32B 2262/101* (2013.01); *B32B 2605/003* (2013.01)

(58) Field of Classification Search
     CPC ....... B60R 13/0861; B32B 3/06; B32B 3/266; B32B 3/30; B32B 2262/101; B32B 2605/003
See application file for complete search history.

(56) References Cited

U.S. PATENT DOCUMENTS

| | | | | |
|---|---|---|---|---|
| 2,253,953 A | * | 8/1941 | Dunbar | E04B 9/001 52/762 |
| 3,037,578 A | * | 6/1962 | Jack | E04B 1/86 181/291 |
| 3,953,067 A | * | 4/1976 | Isola | B60R 13/0212 296/214 |

(Continued)

FOREIGN PATENT DOCUMENTS

JP      2014-051227      3/2014

*Primary Examiner* — Jeremy A Luks
(74) *Attorney, Agent, or Firm* — Greenblum & Bernstein, P.L.C.

(57) ABSTRACT

A silencer includes a panel cover portion and a protrusion cover portion that extends upward from the panel cover portion and covers a protrusion of a panel. The protrusion cover portion includes a first protrusion cover portion and a second protrusion cover portion that have an elongated shape and cover the protrusion. The first protrusion cover portion includes a first protrusion cover body portion and a fitting portion that extends from an end of the first protrusion cover body portion with respect to a longitudinal direction. The second protrusion cover portion includes a second protrusion cover body portion and a stopper portion that extends from an end of the second protrusion cover body portion with respect to the longitudinal direction. The protrusion cover portion has a bag shape that covers the protrusion with the fitting portion and the stopper portion being fitted to each other.

6 Claims, 8 Drawing Sheets

(56) References Cited

U.S. PATENT DOCUMENTS

| | | | | |
|---|---|---|---|---|
| 4,598,010 A | * | 7/1986 | Ollinger | E04B 9/04 |
| | | | | 428/172 |
| 4,779,390 A | * | 10/1988 | Repper | B60R 13/02 |
| | | | | 296/70 |
| 9,988,137 B2 | * | 6/2018 | Borumand | B64C 1/403 |

* cited by examiner

SILENCER COVERING PROTRUSION OF PANEL WITH FITTING PORTION AND STOPPER PORTION FITTED EACH OTHER

CROSS REFERENCE TO RELATED APPLICATION

This application claims priority from Japanese Patent Application No. 2022-84942 filed on May 25, 2022. The entire contents of the priority application are incorporated herein by reference.

TECHNICAL FIELD

The present disclosure relates to a silencer.

BACKGROUND

Sound absorption silencer mats are mounted on various portions of a vehicle. For example, silencers are mounted on an under-engine cover, which is mounted on a lower surface of an engine room, a rear surface of an engine hood, and a dash panel that defines the engine room and a vehicular compartment.

A member on which such a silencer mat is mounted may include a protrusion that protrudes from a mounting surface of the member. To mount the silencer on such a member including the protrusion, the silencer is folded as follows, for example. The portion of the silencer corresponding to the protrusion is folded in a U-shape to make protruding portion. Then, two ends of the U-shaped protruding portion are closed with another member such as staples by a tucker and thus, a bag-shaped protruding portion is formed. The protrusion of the member is fitted in the bag-shaped protruding portion of the silencer. Accordingly, the silencer is appropriately mounted on the member including the protrusion. Or, an end of the U-shaped protruding portion of the silencer may be closed with fixing members such as clips and stud bolts.

However, with using the staples or the fixing members, which are made of material different from that of the silencer, the number of components and a material cost increase. Further, the silencer obtained with using the staples or the fixing members includes different kinds of materials. This causes recycling problems when the silencer is disposed SUMMARY The feature of the technology disclosed herein is to provide a silencer that can be mounted on a member including a protrusion without using a separate mounting member.

The technology described herein relates to a silencer to be mounted on a panel including a panel body portion and a protrusion that protrudes from the panel body portion. The silencer includes a panel cover portion that covers the panel body portion and a protrusion cover portion that extends upward from the panel cover portion and is folded to cover the protrusion. The protrusion cover portion includes a first protrusion cover portion covering a first surface of the protrusion and a second protrusion cover portion covering a second surface of the protrusion that is an opposite surface of the first surface. The first protrusion cover portion has an elongated shape and includes a first protrusion cover body portion that extends in a longitudinal direction and a fitting portion that extends from at least an end of the first protrusion cover body portion with respect to the longitudinal direction. The second protrusion cover portion has an elongated shape and includes a second protrusion cover body portion that extends in the longitudinal direction and a stopper portion that extends from at least an end of the second protrusion cover body portion with respect to the longitudinal direction. The protrusion cover portion has a bag shape that covers the protrusion with the fitting portion and the stopper portion being fitted to each other.

DETAILED DESCRIPTION

One embodiment of the present technology will be described with reference to FIGS. 1 to 5. A silencer 20 that covers a rear wheelhouse panel 10, which stores a vehicular rear tire therein, will be described.

Figure 2:
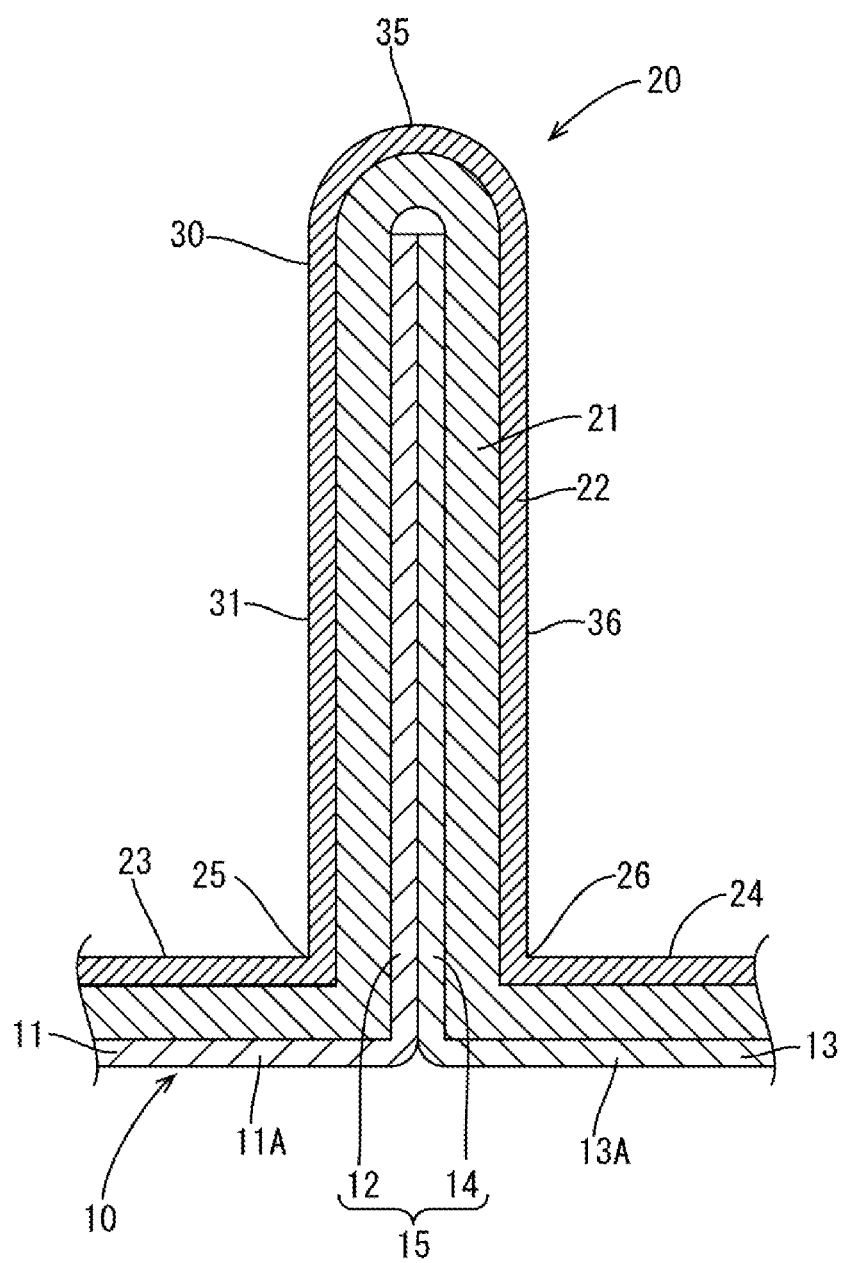
FIG. 2 is a cross-sectional view along line II-II in FIG. 1.

The rear wheelhouse panel 10 includes a storing section on a vehicular exterior side and stores a rear tire in the storing section. The rear wheelhouse panel 10 is configured as a portion of a body panel of a vehicle body. The rear wheelhouse panel 10 includes at least two panels. Each of the panels includes a panel body and a flange portion that projects from an edge of the panel body. By bonding the flange portions with surfaces thereof, the panels are configured as one component. Specifically, as illustrated in FIG. 2, the rear wheelhouse panel 10 includes the panels including a first panel 11 and a second panel 13. The first panel 11 includes a first panel body portion 11A and a first flange portion 12 that projects upward from a portion of an edge of the first panel body portion 11A. The second panel 13 includes a second panel body portion 13A and a second flange portion 14 that projects upward from a portion of an edge of the second panel body portion 13A. The first flange portion 12 and the second flange portion 14 are bonded to each other with opposing surfaces and configured as a protrusion 15 that protrudes from plate surfaces of the first panel body portion 11A and the second panel body portion 13A.

The protrusion 15 has a rectangular plate shape and a size that can be held by an operator. In this embodiment, the protrusion 15 has a protruding height from the first panel body portion 11A and the second panel body portion 13A, which is about 5 cm, and a length extending in a longitudinal direction, which is about 15 cm.

The silencer 20 has sound absorption properties and is made of glass wool or felt. The silencer 20 is a flexible mat member. As illustrated in FIG. 2, the silencer 20 has a two-layered structure and includes a soft layer 21 and a hard layer 22 that is harder than the soft layer 21. The silencer 20 is mounted on the rear wheelhouse panel 10 with the soft layer 21 being contacted with a vehicular interior surface of the rear wheelhouse panel 10.

Figure 1:
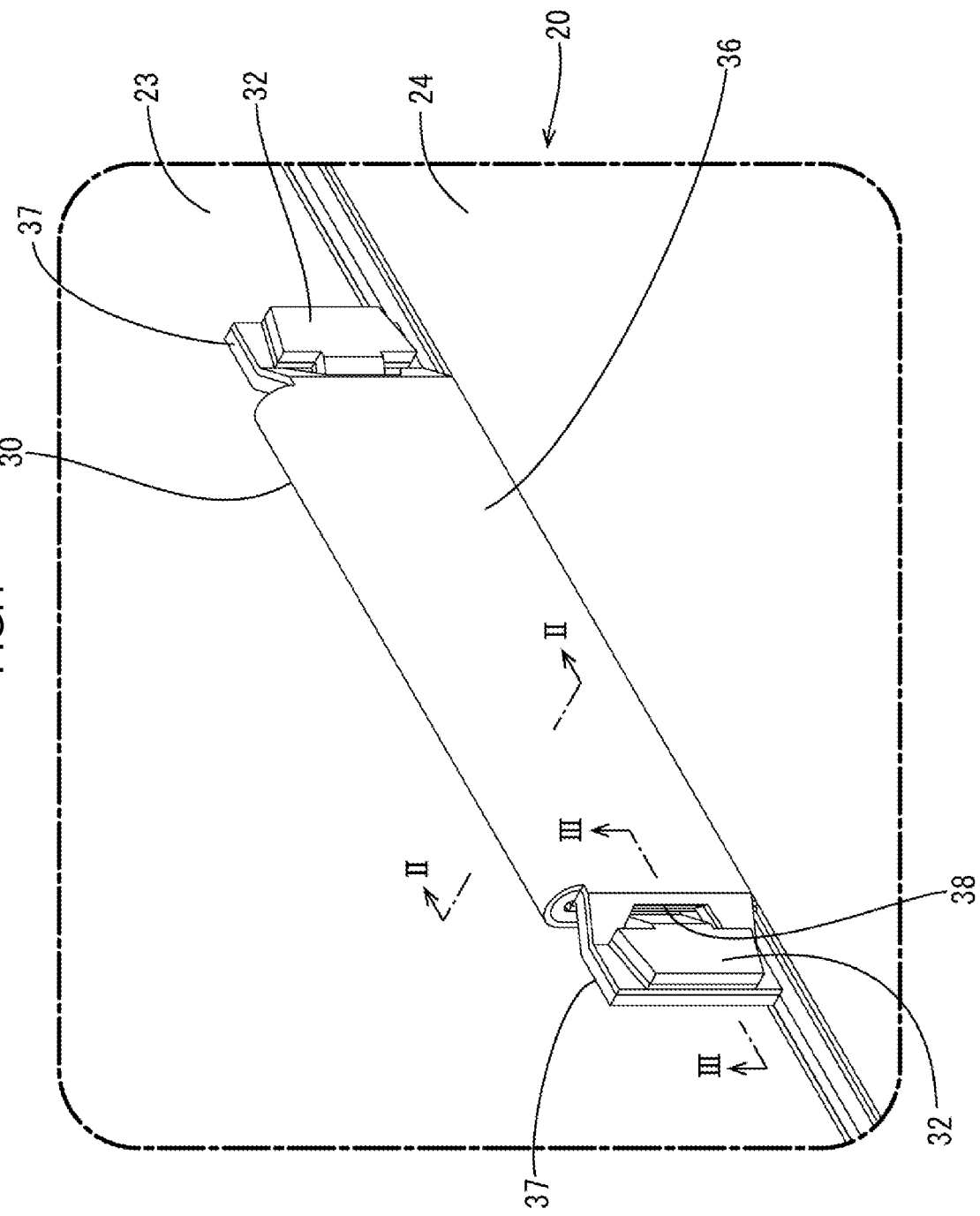
FIG. 1 is a perspective view illustrating a silencer that is mounted on a rear wheelhouse panel.

As illustrated in FIGS. 1 and 2, the silencer 20 includes a first cover portion 23, a second cover portion 24, and a protrusion cover portion 30. The first cover portion 23 covers a vehicular interior surface of the first panel body portion 11A. The second cover portion 24 covers a vehicular interior surface of the second panel body portion 13A. The protrusion cover portion 30 connects the first cover portion 23 and the second cover portion 24 and covers the protrusion 15 of the rear wheelhouse panel 10.

Figure 4:
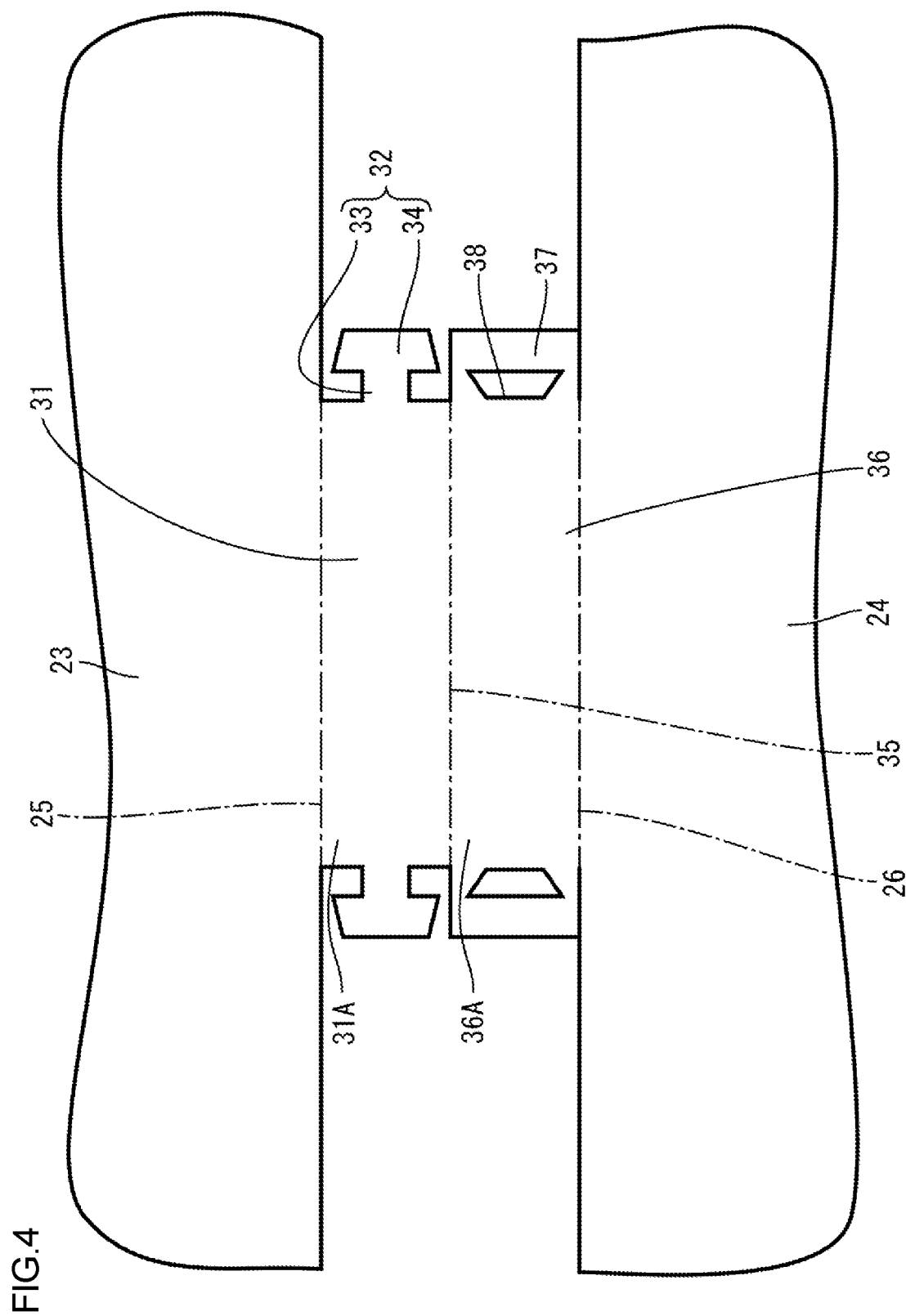
FIG. 4 is a view illustrating a net of a protrusion cover portion.

FIG. 4 is a plan view illustrating a net of the silencer 20 of this embodiment. The protrusion cover portion 30 includes a first flange cover portion 31, a second flange cover portion 36, and a fold portion 35 that is a border between the first flange cover portion 31 and the second flange cover portion 36. The protrusion cover portion 30 is folded at the fold portion 35 such that the first flange cover portion 31 and the second flange cover portion 36 are opposite each other as illustrated in FIG. 2. The first flange cover portion 31 includes a first flange cover body portion 31A and two fitting portions 32. The first flange cover body portion 31A is continuous from the first cover portion 23. The first flange cover body portion 31A has a rectangular shape and covers a first surface (a first surface of the first flange portion 12) of the protrusion 15. The two fitting portions 32 project from two ends of the first flange cover body portion 31A, respectively.

The second flange cover portion 36 includes a second flange cover body portion 36A and two stopper portions 37. The second flange cover body portion 36A is continuous from the second cover portion 24. The second flange cover body portion 36A has a rectangular shape and covers a second surface (a first surface of the second flange portion 14) of the protrusion 15. The two stopper portions 37 extend from two ends of the second flange cover body portion 36A. The stopper portions 37 have a same width as the width of the second flange cover body portion 36A.

The first flange cover body portion 31A and the second flange cover body portion 36A have a same size. According to the above configuration, the first flange cover portion 31 including the fitting portion 32 and the second flange cover portion 36 including the stopper portion 37 are configured as one unitary member. The first flange cover portion 31 including the fitting portion 32 and the second flange cover portion 36 including the stopper portion 37 are made of same material.

The first flange cover body portion 31A and the second flange cover body portion 36A as a whole have a size that is slightly greater than that of the protrusion 15 of the rear wheelhouse panel 10.

The fitting portion 32 of the first flange cover portion 31 includes a basal portion 33 and a distal end portion 34 (one example of a distal end portion). The basal portion 33 extends from a middle of each of the ends of the first flange cover body portion 31A with respect to a width direction. The distal end portion 34 further extends from the basal portion 33. The distal end portion 34 is wider than the basal portion 33. In this embodiment, the distal end portion 34 has a shape of an isosceles trapezoid. The distal end portion 34 has a bottom base that is a long side and continuous to the basal portion 33 and an upper base that is a short side and shorter than the bottom base. The upper base corresponds to a distal end of the fitting portion 32. The distal end portion 34 has a tapered shape.

Figure 5:
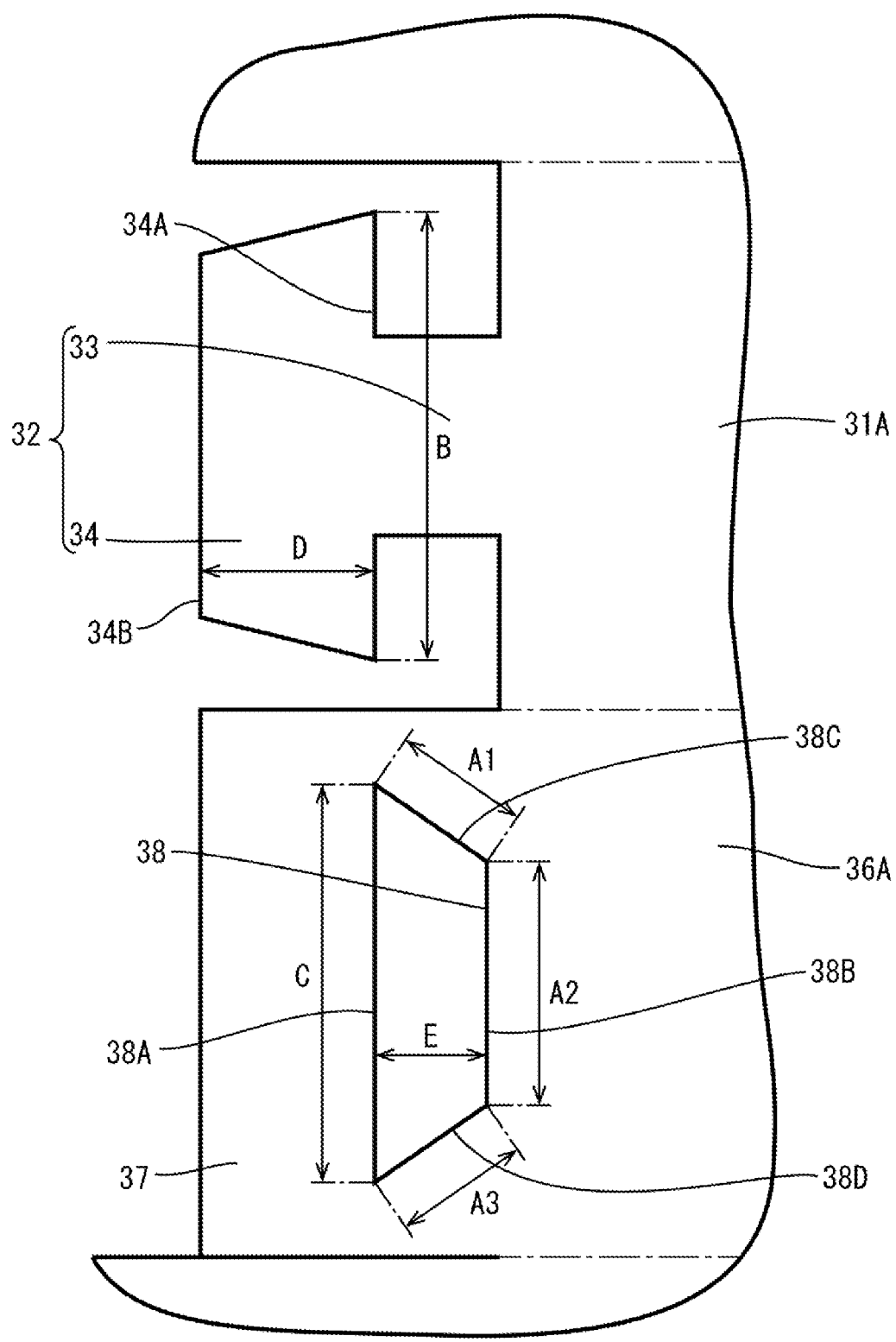
FIG. 5 is an enlarged view of a portion of the protrusion cover portion in FIG. 4.

The stopper portion 37 of the second flange cover portion 36 includes a stopper hole 38 that is through the stopper portion 37. The stopper hole 38 is opposite the basal portion 33 of the fitting portion 32 with the protrusion cover portion 30 being folded along the fold portion 35. The stopper hole 38 has a shape of an isosceles trapezoid. As illustrated in FIGS. 4 and 5, the stopper hole 38 has a bottom base hole edge that is a short side hole edge and is closer to the second flange cover body portion 36A and an upper base hole edge that is a long side hole edge and longer than the bottom base hole edge and is closer to the distal end of the stopper portion 37. The bottom base hole edge and the upper base hole edge are opposite each other.

The fitting portions 32 and the stopper portions 37 will be described more in detail with reference to FIG. 5. The dimensions of the stopper hole 38 are defined to satisfy following relations. In the following, as to the hole edge of the stopper hole 38, the length of a first hole edge 38A, which is the upper base hole edge, is defined as a length C, the length of a hole edge except for the first hole edge 38A is defined as a length A, and the length between the first hole edge 38A and the second hole edge 38B is defined as a length E. The length A is a total of a length A2 of a second hole edge 38B, which is the bottom base hole edge, and lengths A1, A3 of the two hole edges 38C, 38D between the first hole edge 38A and the second hole edge 38B that are opposite each other. As to the fitting portion 32, the length of an edge 34A, which is the bottom base of the distal end portion 34 and closer to the first flange cover body portion 31A, is defined as a length B, the width of the distal end portion 34 that is a length between the edge 34A and an outer edge 34B of the distal end portion 34 is defined as a width D, and the thickness of the distal end portion 34 is defined as F.

A>B>C and D>E>F

With the above relations being satisfied, the fitting portion 32 can be inserted in the stopper hole 38 and stopped at the hole edge of the stopper hole 38.

In this embodiment the above dimensions A, B, C, D, E may represent following dimensions. The length C is a length of the first hole edge 38A of the stopper hole 38 that is closest to an end of the second flange cover portion 36 with respect to the longitudinal direction. The first hole edge 38A extends straight along the end of the second flange cover portion 36. The length C is a greatest dimension among the dimensions of the hole edges of the stopper hole 38 with respect to the width direction of the second flange cover portion 36. The length A is a total length of the hole edges of the stopper hole 38 except for the length C of the first hole edge 38A. The length E is a greatest opening dimension of the stopper hole 38 with respect to the longitudinal direction of the second flange cover portion 36. The length B is a greatest dimension of the distal end portion 34 with respect to the width direction of the first flange cover portion 31. The length D is a greatest dimension of the distal end portion 34 with respect to the longitudinal direction of the first flange cover portion 31.

Figure 3:
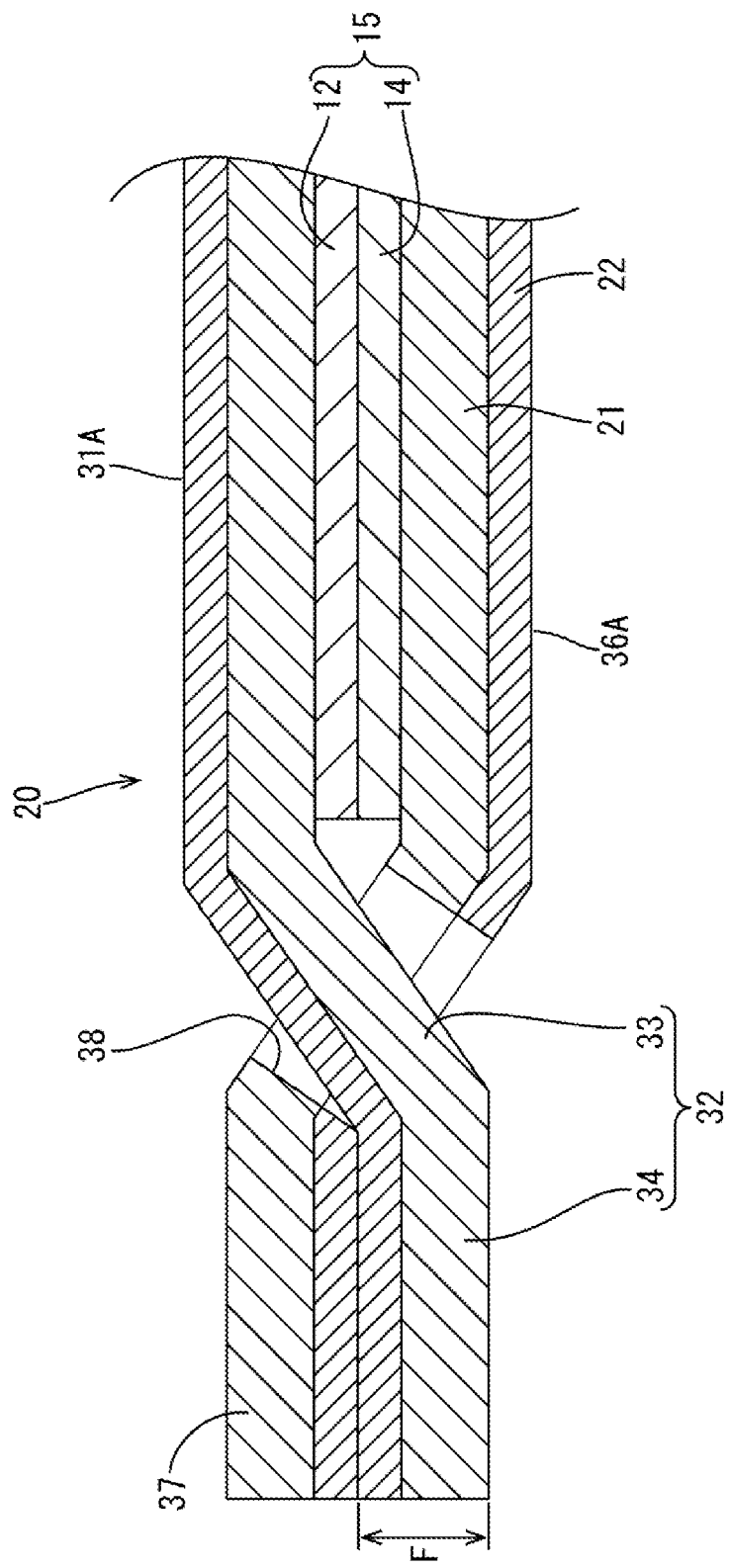
FIG. 3 is a cross-sectional view along line III-III in FIG. 1.

The steps of making the silencer 20 to be mounted on the rear wheelhouse panel 10 will be described. First, as illustrated in FIG. 2, the protrusion cover portion 30 is folded with a mountain fold along the fold portion 35 to form a ridge on the hard layer 22 side. The silencer 20 is folded with valley folds along a border 25 between the first cover portion 23 and the first flange cover portion 31 and along a border 26 between the second cover portion 24 and the second flange cover portion 36 to form trenches on the hard layer 22 side. As a result, the first flange cover portion 31 and the second flange cover portion 36 project upward from the first cover portion 23 and the second cover portion 24, respectively, and the first cover portion 23 and the second cover portion 24 extend in opposite directions from the borders 25, 26, respectively. Next, the basal portion 33 and the distal end portion 34 of the fitting portion 32 are inserted in the stopper hole 38 with being deformed. After being inserted through the stopper hole 38, the distal end portion 34 elastically restores its shape. Then, as illustrated in FIG. 3, the basal portion 33 is disposed in the stopper hole 38 and the distal end portion 34 is stopped at the hole edge of the stopper hole 38. The protrusion cover portion 30 projects upward from the first cover portion 23 and the second cover portion 24 and is closed at two ends in the longitudinal direction and thus, the protrusion cover portion 30 is formed into a bag shape.

The first flange cover portion 31 has a first outer surface and a first inner surface, which are a surface of the hard layer 22 and a surface of the soft layer 21, respectively. The second flange cover portion 36 has a second outer surface and a second inner surface, which are the surface of the hard layer 22 and the surface of the soft layer 21, respectively. With the fitting portion 32 and the stopper portion 37 being fitted to each other, the first inner surface is opposite the second inner surface with sandwiching the protrusion 15 in the first flange cover body portion 31A and the second flange cover body portion 36A and the first outer surface is opposite the second outer surface in the fitting portion 32 and the stopper portion 37. The basal portion 33 extends from the first flange cover body portion 31A in an extending direction (the longitudinal direction of the first flange cover portion 31) and has a first width measured in a width direction perpendicular to the extending direction. The distal end portion 34 has a second width measured in the width direction and the second width is greater than the first width. The distal end portion 34 has the edges 34A that extend from the basal portion 33 along the width direction. With the fitting portion 32 and the stopper portion 37 being fitted to each other, the edges 34A of the distal end portion 34 of the fitting portion 32 are stopped at the second hole edge 38B of the stopper hole 38.

The protrusion cover portion 30 is preferably subjected to press molding before folding the silencer 20. With the press molding being performed to the protrusion cover portion 30, the fitting portions 32 that are bent and stopped at the stopper holes 38 and the protrusion cover portion 30 that is folded along the fold portion 35 and the borders 25, 26 are less likely to return to their original states (a flat state) due to the elastic restoring force of the silencer 20.

Specifically, as illustrated in FIG. 3, with the protrusion cover portion 30 being folded along the fold portion 35 and the borders 25, 26, the basal portion 33 of the fitting portion 32 is bent and sloped to be closer to the stopper portion 37 from a first flange cover body portion 31A side of the basal portion 33. A basal portion of the stopper portion 37 including the stopper hole 38 is bent and sloped to be closer to the fitting portion 32 from the second flange cover body portion 36A. According to such a configuration, the fitting portion 32 is easily inserted in the stopper hole 38 and the fitting portion 32 that is inserted through the stopper hole 38 can be stably maintained. With the distal end portion of the fitting portion 32 being made thinner, the distal end portion can be easily deformed and the fitting portion 32 can be inserted in the stopper hole 38 easily.

Next, operations and effects will be described. The silencer 20 of this embodiment is a mat silencer and is mounted on the rear wheelhouse panel 10 including the protrusion 15 that protrudes from the plate surface of the rear wheelhouse panel 10. The silencer 20 includes the first cover portion 23, the second cover portion 24, the first flange cover portion 31, and the second flange cover portion 36. The first cover portion 23 covers the plate surface of the first panel body portion 11A and the second cover portion 24 covers the plate surface of the second panel body portion 13A. The first flange cover portion 31 extends upward from the first cover portion 23 and the second flange cover portion 36 extends upward from the second cover portion 24. The first flange cover portion 31 and the second flange cover portion 36 are joined at the extended ends thereof. The first surface of the protrusion 15 is covered with the first flange cover portion 31 and the second surface of the protrusion 15 that is opposite from the first surface is covered with the second flange cover portion 36. The first flange cover portion 31 includes the fitting portions 32 in the two end portions with respect to the longitudinal direction. The second flange cover portion 36 includes the stopper portions 37 including the stopper holes 38, to which the fitting portions 32 are fitted, in the two end portions with respect to the longitudinal direction. With the fitting portions 32 being fitted in the stopper holes 38, the first flange cover portion 31 and the second flange cover portion 36 are connected to each other to be formed in a bag shape and cover the protrusion 15.

According to the above configuration, even with the rear wheelhouse panel 10 including the protrusion 15 on which the silencer 20 is to be mounted, a bag-shaped portion that projects from the plate surface of the silencer 20 can be formed on the silencer 20 without using an additional member. The protrusion 15 can be covered with the bag-shaped portion. Namely, the silencer 20 that is made of one single material and good in recycling can be provided.

The fitting portion 32 includes the basal portion 33 and the distal end portion 34 that extends from the basal portion 33 and is wider than the basal portion 33. The stopper hole 38 is narrower than the distal end portion 34 and the distal end portion 34 is stopped by the hole edge of the stopper hole 38.

<Modifications>

Figure 6:
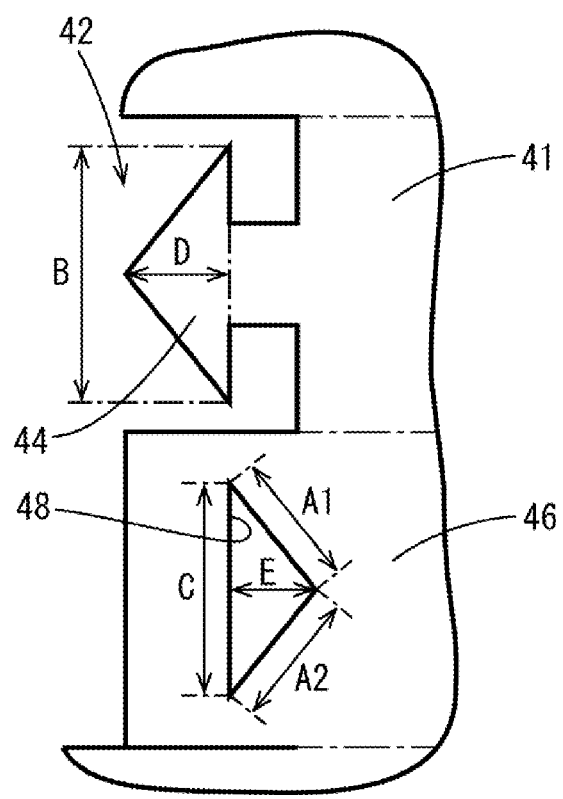
FIG. 6 is an enlarged view of a portion of a protrusion cover portion according to a modification.
Figure 7:
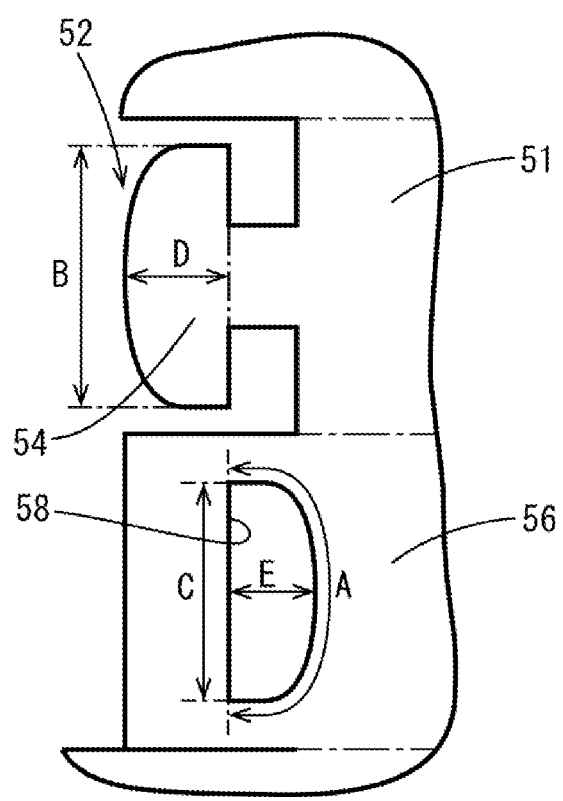
FIG. 7 is an enlarged view of a portion of a protrusion cover portion according to another modification.
Figure 8:
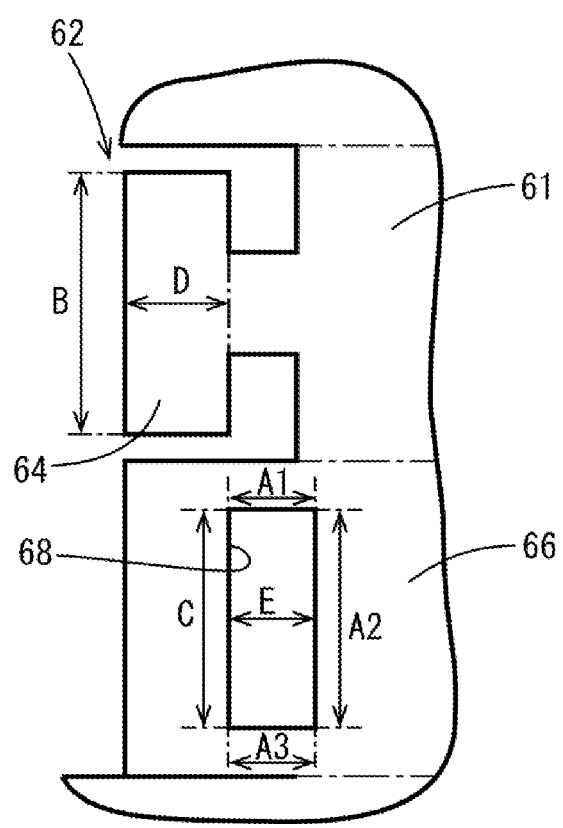
FIG. 8 is an enlarged view of a portion of a protrusion cover portion according to another modification.

The configurations of the fitting portion and the stopper hole may not be limited to the configurations described in the above embodiment but may be modified as illustrated in FIGS. 6 to 8. The fitting portion and the stopper hole may have any configurations as long as the dimensions A to F satisfy the above-described relations. In the configurations in FIGS. 6 to 8, the symbols A to F represent the dimensions similar to those in the first embodiment.

In the configuration illustrated in FIG. 6, a distal end portion 44 of a fitting portion 42 has a triangular shape and a vertex of the triangular shape is disposed close to an end of the first flange cover portion 41 with respect to the longitudinal direction. The length D is a greatest length of the distal end portion 44 with respect to the longitudinal direction of the first flange cover portion 41. A stopper hole 48 has a triangular shape similar to that of the distal end portion 44. A vertex of the triangular hole edge of the stopper hole 48 is disposed far from the end of the second flange cover portion 46 with respect to the longitudinal direction. The length E is a greatest opening width of the stopper hole 48 with respect to the longitudinal direction of the second flange cover portion 46. The length A of the hole edge of the stopper hole 48 is a total of the length A1 and the length A2.

In the configuration illustrated in FIG. 7, a distal end portion 54 of a fitting portion 52 has a semicircular shape and an end of the distal end portion 54 is curved. Namely, an end of a first flange cover portion 51 with respect to the longitudinal direction is curved. The length D is a greatest length of the distal end portion 54 with respect to the longitudinal direction of the first flange cover portion 51. A stopper hole 58 has a semicircular shape similar to that of the distal end portion 54. A curved opening edge of the stopper hole 58 is disposed far from the end of the second flange cover portion 56 with respect to the longitudinal direction. The length E is a greatest opening width of the stopper hole 58 with respect to the longitudinal direction of the second flange cover portion 56. The length A of the hole edge of the stopper hole 58 is a length of the curved opening edge.

In the configuration illustrated in FIG. 8, a distal end portion 64 of a fitting portion 62 has a rectangular shape and is disposed such that a short-side direction of the distal end portion 64 corresponds to a longitudinal direction of the first flange cover portion 61. The length D is a greatest length of the distal end portion 64 with respect to the longitudinal direction and is a length of the short side of the distal end portion 64. The stopper hole 68 has a rectangular shape similar to that of the distal end portion 64. The length E is a greatest opening width of the stopper hole 68 with respect to the longitudinal direction of the second flange cover portion 66 and is the length of the short side of the distal end portion 64.

OTHER EMBODIMENTS

The technology described herein is not limited to the embodiments and modifications described above with reference to the drawings. The technical scope of the present disclosure may include the following embodiments and all modifications in the scope of claim or its equivalent scope.
(1) In the above embodiment and modifications, the silencer 20 is configured to cover the protrusion 15 that is formed by bonding the first flange portion 12 and the second flange portion 14 of the two panels 11, 13. However, the technology described herein may be applied to a protrusion like a rib that protrudes from a plate surface of one plate.
(2) In the above embodiment and modifications, the fitting portions including the distal end portions are inserted in the stopper holes, respectively; however, the configuration of the fitting portions and the stopper portions is not limited to those of the above embodiment and modifications and may be modified as appropriate. For example, slits may be included instead of the stopper holes.
(3) In the above embodiment and modifications, the two ends of the protrusion cover portion 30 are closed with the fitting portions (32) and the stopper portions (the stopper holes 38). However, a bag-shaped configuration with one end of the protrusion cover portion being closed with the fitting portion and the stopper portion and the other end not being closed with such a configuration but being fixedly closed may be included in the present technology.

The invention claimed is:

1. A silencer to be mounted on a panel including a panel body portion and a protrusion that protrudes from the panel body portion, the silencer comprising:
a panel cover portion that covers the panel body portion; and
a protrusion cover portion that extends upward from the panel cover portion and is folded to cover an outer surface of the protrusion, the protrusion cover portion including a first protrusion cover portion covering a first surface of the outer surface of the protrusion and a second protrusion cover portion covering a second surface of the outer surface of the protrusion that is an opposite surface of the first surface,
the first protrusion cover portion having an elongated shape and including a first protrusion cover body portion that extends in a longitudinal direction and a fitting portion that extends from at least an end of the first protrusion cover body portion with respect to the longitudinal direction, and
the second protrusion cover portion having an elongated shape and including a second protrusion cover body portion that extends in the longitudinal direction and a stopper portion that extends from at least an end of the second protrusion cover body portion with respect to the longitudinal direction, wherein
the protrusion cover portion covers the outer surface of the protrusion with the fitting portion and the stopper portion being fitted to each other,
the fitting portion includes a basal portion that extends from the first protrusion cover body portion and a distal end portion that extends from the basal portion,
the distal end portion is wider than the basal portion, and
the stopper portion includes a stopper hole in which the fitting portion is fitted and that is narrower than the distal end portion of the fitting portion.

2. The silencer according to claim 1, wherein the first protrusion cover portion including the fitting portion and the second protrusion cover portion including the stopper portion are configured as one unitary member.

3. The silencer according to claim 1, wherein the first protrusion cover portion including the fitting portion and the second protrusion cover portion including the stopper portion are made of same material.

4. The silencer according to claim 1, wherein
the basal portion extends from the first protrusion cover body portion in an extending direction and has a first width measured in a width direction perpendicular to the extending direction,
the distal end portion has a second width measured in the width direction and the second width is greater than the first width,
the distal end portion has edges that extend from the basal portion along the width direction, and
with the fitting portion and the stopper portion being fitted to each other, the edges of the distal end portion of the fitting portion are stopped at a hole edge of the stopper hole.

5. A silencer to be mounted on a panel including a panel body portion and a protrusion that protrudes from the panel body portion, the silencer comprising:
a panel cover portion that covers the panel body portion; and
a protrusion cover portion that extends upward from the panel cover portion and is folded to cover an outer surface of the protrusion, the protrusion cover portion including a first protrusion cover portion covering a first surface of the outer surface of the protrusion and a second protrusion cover portion covering a second surface of the outer surface of the protrusion that is an opposite surface of the first surface,
the first protrusion cover portion having an elongated shape and including a first protrusion cover body portion that extends in a longitudinal direction and a fitting portion that extends from at least an end of the first protrusion cover body portion with respect to the longitudinal direction, and
the second protrusion cover portion having an elongated shape and including a second protrusion cover body portion that extends in the longitudinal direction and a stopper portion that extends from at least an end of the second protrusion cover body portion with respect to the longitudinal direction, wherein the protrusion cover portion covers the outer surface of the protrusion with the fitting portion and the stopper portion being fitted to each other, the first protrusion cover portion has a first outer surface and a first inner surface and the second protrusion cover portion has a second outer surface and a second inner surface, and with the fitting portion and the stopper portion being fitted to each other, the first inner surface faces the second inner surface with sandwiching the protrusion in the first protrusion cover body portion and the second protrusion cover body portion, and the first outer surface faces the second outer surface in the fitting portion and the stopper portion.

6. The silencer according to claim 5, wherein the fitting portion includes a basal portion that extends from the first protrusion cover body portion and a distal end portion that extends from the basal portion, the distal end portion is wider than the basal portion, and the stopper portion includes a stopper hole in which the fitting portion is fitted and that is narrower than the distal end portion of the fitting portion.

* * * * *